Patented Apr. 2, 1940

2,195,596

UNITED STATES PATENT OFFICE 2,195,596

PROTECTED-VITAMIN-CONTAINING TABLET

Ferdinand W. Nitardy, Brooklyn, N. Y., assignor to E. R. Squibb & Sons, New York, N. Y., a corporation of New York No Drawing. Application November 7, 1936, Serial No. 109,759

4 Claims. (Cl. 167—81)

This invention relates to vitaminic therapeutic and alimentary compositions, and has for its object the provision of such compositions in a form suitable for tableting and adapted to serve an extra physiological function.

On account of their lability in the presence of air, it has been found advisable to protect vitaminic substances—including the liver oils of such fishes as the halibut, swordfish, tuna, and salmon, concentrates thereof, and irradiated ergosterol and cholresterol—by incorporating them into fatty materials (which term, as used herein, embraces fats and oils and edible higher alcohols, especially sterols, preferably solid at room temperature and fusible at body temperature, among them cocoa butter and propylene glycol stearate); but the presence of the requisite proportion of these fatty materials has made satisfactory tableting difficult.

In the practice of this invention, therapeutic and alimentary compositions are prepared by mixing fatty materials into which vitaminic substances have been incorporated, with a calcium salt, the gluconate being preferred but numerous other calcium salts also being usable, among them the secondary phosphate, the tertiary phosphate, lactate, lactophosphate, adipate, carbonate, citrate, galactonate, mucate, sorbate, ascorbate, tartrate, levulinate, mannonate, malate, saccharate, hypophosphite, and glycerophosphate. Not only are these compositions readily compressible into tablets of the desired hardness, but the calcium salt, in addition to constituting an absorbent carrier, introduces an essential nutritive factor and, particularly when phosphorus is also supplied (e. g. in dicalcium phosphate), cooperates with vitamin D to determine the normal deposition of calcium phosphate in the bones.

Compositions of the invention may be compounded by any of the known processes, and appropriate excipients, sweetening and flavoring agents, antioxidants, and other ingredients may of course be included. Thus the fatty material (solid or liquefied) in which the vitaminic substance has been incorporated may be added as such, or in a volatile solvent (afterwards evaporated), to a granulation of the calcium salt and other ingredients; or the fatty material and the calcium salt may be separately granulated and then intermingled. The granulations may then be formed or compressed, by one of the customary methods, into unit-dose tablets or the like, which may be coated. All these operations are preferably conducted in a vacuum or in an inert atmosphere.

Example 1

| | | |
|---|---|---|
| Dicalcium phosphate | grams | 640 |
| Calcium gluconate | do | 960 |
| Powdered sugar | do | 400 |
| Sodium carbonate | do | 25 |
| Water | cc | 420 |

The dicalcium phosphate and the calcium gluconate are separately granulated with the aid of the sugar and water, the sodium carbonate being dissolved in the portion of the water used to granulate the calcium gluconate. The granulations are then dried, milled to a uniform size, mixed, and the mixture evacuated (to remove occluded air), whereupon (a) the mixture of granulations, preferably while still under vacuum (to facilitate penetration of the solution), is treated with a vitaminic substance, such as the liver oil of the halibut, swordfish, tuna, or salmon, or a concentrate thereof, or irradiated ergosterol or cholesterol, or mixtures of two or more of these, preferably dissolved in a melted fat, and mixed with a small amount (0.5% to 2.0% of the fat used) of an alkaline substance such as powdered magnesium or calcium oxide or hydroxide or sodium carbonate; or (b) the mixture of granulations, preferably while still under vacuum, may have a solution of one or more of these vitaminic substances (dissolved in a volatile solvent, such as ether, which is subsequently evaporated off) poured over it and, together with one of the above-named alkaline powders, the ingredients may be well mixed in order to distribute the vitaminic substance and the powder uniformly over the granules. The finished granulation may be packaged and/or consumed, or tablets may be prepared therefrom in accordance with standard pharmaceutical procedures.

Example 2

| | | |
|---|---|---|
| Dicalcium phosphate | grams | 800 |
| Calcium lactate | do | 800 |
| Milk sugar | do | 80 |
| Dextrose | do | 100 |
| Starch paste | do | 150 |
| Water | cc | 180 |

The dicalcium phosphate is mixed with the dextrose and granulated with the aid of the water; the calcium lactate is mixed with the milk sugar and granulated by means of the starch paste; and the granulations are then dried, milled to uniform size, mixed, and the mixture evacuated. Subsequent processing of this mixture is similar to that of Example 1.

Example 3

| | | |
|---|---|---|
| Calcium glycerophosphate | grams | 800 |
| Calcium lactophosphate | do | 1200 |
| Water | cc | 250 |

A saturated solution of calcium lactophosphate in the water is prepared and used to granulate the remaining portion of the calcium lactophosphate and the calcium glycerophosphate. The granulations are then dried, milled to uniform size, mixed, and the mixture evacuated. Subsequent processing is similar to that of Example 1.

Example 4

| | | |
|---|---|---|
| Calcium phosphate | grams | 1200 |
| Calcium adipate | do | 800 |
| Sodium carbonate | do | 25 |
| Cane sugar syrup | cc | 500 |

These ingredients are processed in a manner similar to that of Example 1.

Example 5

| | Grams |
|---|---|
| Dry sodium phosphate | 400 |
| Glucose syrup | 100 |
| Calcium gluconate | 1600 |
| Cane sugar syrup | 400 |
| Magnesium hydroxide | 25 |

The sodium phosphate is mixed with the glucose syrup, granulated in the usual manner, and dried; the calcium gluconate is mixed with the cane sugar syrup, granulated in the usual manner, and dried; the two granulations and the magnesium hydroxide are then mixed and impregnated with a vitaminic substance in a manner similar to that of Example 1.

Example 6

400 g. of dry sodium phosphate is thoroughly mixed with enough starch paste to facilitate granulation and the granules are dried; 1600 g. of calcium saccharate is moistened with sufficient water and acacia solution, glucose, cane sugar or similar binding material to facilitate granulation and these granules are dried; and the two granulations are mixed, impregnated with a vitaminic substance, and compressed into tablets or the like.

Example 7

| | Grams |
|---|---|
| Dicalcium phosphate | 220 |
| Calcium gluconate | 150 |
| Powdered sugar | 550 |
| Solid-fat (say cocoa-butter) solution of irradiated ergosterol | 65 |
| Methyl salicylate | 2 |
| Talc | 20 |

The dicalcium phosphate and the calcium gluconate, each with half of the sugar, are separately granulated with the aid of the water, the granulations are dried, dusted with the talc, and mixed, and the mixture is evacuated (to eliminate occluded air), whereupon: (a) the vacuum having been replaced by an inert atmosphere, such as carbon dioxide, the mixture of granulations is intermingled with granules formed (by extrusion) from the solid-fat solution of irradiated ergosterol, the mass chilled to a low temperature (to prevent fusion during the subsequent compression), and, while still maintained under anaeric conditions, sprayed with the methyl salicylate and compressed into wafers; or (b) the mixture of granulations, preferably while warm and still under vacuum (to facilitate penetration by the solution), may have the solid-fat solution melted and poured over and well mixed with it, and, the vacuum then being replaced by an inert atmosphere, the granules are cooled, sprayed with the methyl salicylate, and formed into wafers.

Example 8

| | Grams |
|---|---|
| Lactose | 206 |
| Malt sugar | 32 |
| Calcium gluconate | 79 |
| Refined fish-liver oil | 33 |

These ingredients are granulated and tabulated as in the preceding examples.

It is to be understood that the foregoing examples are merely illustrative and not limitative of the invention, which may be variously otherwise embodied within the scope of the appended claims.

I claim:

1. A protected-vitamin-containing therapeutic or alimentary tablet formed by compression of a composition consisting of a solid solution of a fat-soluble vitaminic substance in a solid fatty material carried by a granulation essentially comprising a calcium salt.

2. A protected-vitamin-containing therapeutic or alimentary table formed by compression of a composition consisting of a solid solution of a fat-soluble vitaminic substance in a solid fatty material carried by a granulation essentially comprising calcium gluconate.

3. The method of preparing protected-vitamin-containing therapeutic or alimentary tablets which comprises absorbing a solid solution of a fat-soluble vitaminic substance in a solid fatty material on a granulation essentially comprising a calcium salt, and compressing the composition into tablets.

4. The method of preparing protected-vitamin-containing therapeutic or alimentary tablets which comprises absorbing a solid solution of a fat-soluble vitaminic substance in a solid fatty material on a granulation essentially comprising calcium gluconate, and compressing the composition into tablets.

FERDINAND W. NITARDY.